United States Patent [19]

Blanchard

[11] Patent Number: 4,716,536

[45] Date of Patent: Dec. 29, 1987

[54] MEASUREMENT CALIBRATION

[75] Inventor: Robert L. Blanchard, Lexington, Mass.

[73] Assignee: The Foxboro Company, Foxboro, Mass.

[21] Appl. No.: 723,763

[22] Filed: Apr. 16, 1985

[51] Int. Cl.$^4$ .............................................. G01F 23/26
[52] U.S. Cl. ..................................... 364/571; 73/1 H; 73/304 C; 340/620; 361/284; 364/550
[58] Field of Search ........................ 364/509, 571, 550; 73/1 H, 304 C; 340/347 R, 620; 361/284

[56] References Cited

U.S. PATENT DOCUMENTS

| | | | |
|---|---|---|---|
| 3,176,221 | 3/1965 | Stamler | 324/61 P |
| 3,236,091 | 2/1966 | Cohn | 73/1 H |
| 3,830,090 | 8/1974 | Hersch et al. | 73/1 H |
| 4,147,050 | 4/1979 | Rubel | 73/1 H |
| 4,383,444 | 5/1983 | Beaman et al. | 73/1 H X |
| 4,388,828 | 6/1983 | Dougherty | 364/571 X |
| 4,499,767 | 2/1985 | Fathauer et al. | 73/1 H |
| 4,603,581 | 8/1986 | Yamanoue et al. | 73/304 C |
| 4,624,139 | 11/1986 | Collins | 73/304 C |

OTHER PUBLICATIONS

Woytowicz, "Capacitance in Continuous Level Sensing," *Sensors*, pp. 40–41 Drexelbrook Engineering Co., Dec. 1986.

Primary Examiner—Gary V. Harkcom
Assistant Examiner—H. R. Herndon
Attorney, Agent, or Firm—Terrence (Terry) Martin; Jack H. Wu; William E. Meyer

[57] ABSTRACT

A calibration apparatus and associated method for the measurement of valuable fluids in storage or at the point of transfer. More particularly, a calibration apparatus and method for use with capacitive liquid level measurement systems.

44 Claims, 19 Drawing Figures $$L = K \times \frac{C_o(e_l-e_g)\frac{h}{H} + (C_o e_g - B)}{R} \qquad \text{Eq. (1)}$$

where:

- L is the indicated level height
- h is the level height
- H is the height of the segment
- K is the channel scale factor with the nominal adjustment:
  $$K = \frac{HR}{C_o(e_l - e_g)}$$

- $C_o$ is the empty segment capacitance
- $e_l$ is the liquid dielectric constant
- $e_g$ is the vapor dielectric constant
- B is the effective value of an electronic balance capacitance with the nominal adjustment
  $$B = C_o e_g$$
- R is a reference channel value, common to calibrator and segment channels, of the form: $[C_r e_l]$, $C_r$ being the capacitance of a submerged reference segment

*FIG. 7A*

$$\frac{dL}{dC_o} = \frac{K}{R} \times \frac{(e_l-e_g)h + e_g H}{H} \qquad \text{Eq. (2)}$$

$$dL = H \times \frac{e_l}{e_l - e_g} \times \frac{dC_o}{C_o} \qquad \text{max value at } h = H$$

*FIG. 7B*

$$\frac{dL}{de_g} = \frac{K}{R} \times \frac{C_o H - C_o h}{H} \qquad \text{Eq. (3)}$$

$$dL = H \times \frac{e_g}{e_l - e_g} \times \frac{de_g}{e_g} \qquad \text{max value at } h = 0$$

*FIG. 7C*

$$\frac{dL}{dB} = -\frac{K}{R} \qquad \text{Eq. (4)}$$

$$dL = -H \times \frac{e_g}{e_l - e_g} \times \frac{dB}{B}$$

*FIG. 7D*

$$\frac{dL}{dK} = \frac{C_o e_l - C_o e_g}{R} \qquad \text{Eq. (5)}$$

$$dL = H \times \frac{dK}{K} \qquad \text{max value at } h = H$$

*FIG. 7E*

$$h = (L_m - Z) \times K_s \qquad \text{Eq. (6)}$$

where

- $L_m$ is the uncorrected measured value of liquid height
- $h$ is the corrected liquid height corresponding to $L_m$
- $Z$ is the zero correction parameter
- $K_s$ is the scale correction parameter

*FIG. 8A*

The zero correction parameter $Z = E_o$      Eq. (7)

where $E_o$ is the captured value of the measured segment channel output when the liquid level is below the segment

*FIG. 8B*

$$K_s = \frac{1}{N} \sum_{n=1}^{N} \frac{h_{cn}}{(L_{mn} - E_o)} \qquad \text{Eq. (8)}$$

where

- $N$ is the number of calibration values to be averaged
- $n$ identifies an individual measurement
- $h_c$ is the liquid height measurement in the calibrator channel corresponding to $L_m$

*FIG. 8C*

$$K_s = \frac{H}{L_{mf} - E_o} \quad \text{Eq. (9)}$$

where

- H is the height of the segment
- f is a subscript signifying full of liquid

*FIG. 8D*

$$Z = \frac{1}{N} \sum_{n=1}^{N} \frac{HL_{mn} - h_{cn}L_{mf}}{H - h_{cn}} \quad \text{Eq. (10)}$$

*FIG. 8E*

$$K_s = \frac{H}{L_{mf} - Z} \quad \text{Eq. (11)}$$

*FIG. 8F*

$$h_c = h_r + (L_m - Z) \times K_s \quad \text{Eq. (12)}$$

where

- $h_r$ is the height of the calibrator zero above the segment mounting flange

*FIG. 8G*

MEASUREMENT CALIBRATION

TECHNICAL FIELD

The present invention relates to liquid measuring and especially to measurement of valuable liquids in storage or transfer or at the point of custody transfer. More particularly, the pesent invention relates to methods and apparatus for precisely measuring valuable volatile liquids which are typically petroleum and liquefied hydrocarbon products, such as at the point of no-loading or off-loading from a cargo carrier.

BACKGROUND OF THE INVENTION

One type of fluid level meter known in the prior art uses a plurality of stacked capacitive level sensors, each having an essentially constant resolution per unit of length. Such sensors can be formed of an outer electrode which is generally continuous, and from an inner electrode can be preferably segmented. Thus, the sensor part of the system is comprised of a plurality of segmented sensor portions stacked from bottom to top, one above another, forming an entire sensor module.

Significant improvements in measuring precision for certain liquids were made possible by apparatus such as that described in U.S. Pat. Nos. 3,301,056 ('056) and by 3,797,311 ('311) to R. L. Blanchard et al. The '311 patent incorporated one or more segmented capacitive sensors ("segments") having a pair of sensing electrodes, which when immersed in a fluid and an a-c voltage is applied to the sensor, provide an electrical output related to the level of the fluid between the electrodes. A reference sensor unit adapted to be completely immersed in the fluid enables control of the driving voltage applied to the sensing capacitor segment in such a manner as to make the output of the sensing capacitor segment independent of both the dielectric constant of the fluid and the driving voltage, and proportional to the ratio of the sensing segment capacitance to the reference segment capacitance.

In order to improve the resolution of such a measuring system, U.S. Pat. No. 3,797,311 suggests use of shorter segments at the extreme ends of the sensor, in combination with one or more longer intermediate inner electrode segments. The segments have generally equal resolution per unit of length, and thus the shorter segments provide greater overall resolution at the extremities (only). The present invention enables calibration of the segments at the time of and in the actual environment of use, and thus presents an accuracy improvement over the prior art, including when such improved resolution techniques are utilized.

As compared with the previous art, the '056 and '311 patents represented great strides in measuring instrument accuracy. Such capacitive fluid level meters have inherently good uniform resolution over the length thereof. Some applications require metering apparatus which has greater resolution over certain portions of the liquid level range. For example, when measuring a very valuable fluid such as liquefied natural gas ("LNG") in the hold of a cargo carrier, it is especially important to have an ability to precisely measure the fluid level at the upper and lower levels in the tank in order to accurately determine the quantity of gas stored or loaded into or off-loaded from the cargo carrier, especially a carrier such as a tanker. On-loading or off-loading cargo transfers, called custody transfers, may involve cargo valuable in many millions of dollars. Such custody transfers may occur 15 or more times a year over many years, with periodic system recalibration taking place only when the ship is in drydock. The system may lose measurement accuracy over time, resulting in highly valuable cargo transfer errors. Aside from the accuracy of instruments per se, has been the need for calibration of the instruments at the time of an in the environment of use.

The prior art provided a useful method and apparatus for estimating and simulating the "empty" and "full" conditions for system adjustment, by providing for the empty, dry or air values. Such system adjustment could be performed by connecting the output of a segment to a summing junction and subtracting from it a signal corresponding to the output of the segment when empty. Provision was made for cancellation of stray pickup effects at the junction by adding electrical signals of appropriate magnitude and phase to cancel the stray pickup. The system segments were initially calibrated for zero and full scale.

Adjustment for a zero setting could be accomplished by such subtracting of the equivalent "empty" capacitance of each sensor segment. To estimate and simulate a full scale condition would normally require experimentally immersing the sensor segment in the proper liquid, a difficult task for very large carriers such as ocean tankers. The level sensor output is effectively the ratio of its capacitance to that of the reference sensor segment, whether or not both sensor segments are empty or fully immersed. Thus full scale calibration is accomplished by disconnecting the empty value compensation of the sensors and setting the indicator to full scale with the sensors empty. The output of each sensor segment signal channel is provided with an adjustment to separately adjust the output of the segment for full scale value.

Effective though the prior art is, it is based on prediction and simulation of the conditions in which the gauging system will be used. Such predictions and simulations are based on typical or average circumstances and are not identical to any specific case. In the present invention calibration is based on actual conditions for the particular sensor, tank, and operating circumstances.

Quite commonly, a plurality of separate tanks is provided in each vessel, requiring multiple calibration efforts, using cables of varying length. Over time, the electronics, sensor and cable characteristics change and thus introduce an error difference which is not accommodated in the prior art measurement method. Calibration during actual loading/unloading measurement, according to the present invention, permits compensation for such errors.

Natural gas is a volatile fluid, some of which is typically lost during long-distance transport. Often carriers are equipped with apparatus to cool the partly empty tanks using small quantities of the LNG stocks. Also, some carrier vessels include locomotion means which use a portion of the LNG as fuel. The tanks are rarely completely emptied upon discharge or completely filled with loading.

It is therefore rarely possible to know accurately what quantity of the fluid is delivered based only on the quantity loaded into the carrier, or based only on tank capacity.

A further improvement in adjustment technology for partly filled tanks is described in U.S. patent application Ser. No. 604,544, now U.S. Pat. No. 4,528,839 for "Transfer Calibration System", which application is assigned to the assignee of the present invention.

The transfer calibrator and the calibration technique proposed in that patent application is for use with a measurement system having a plurality of measurement sensors and sensor segments, a control unit, and a plurality of cables, each cable interconnecting one of the sensor segments to a control unit. In the prior art, the characteristics of each particular sensor segment and its associated cable all have an effect on the measurement made. This situation represents typical shipboard and storage installations. Specifically, the technique described in the application extends the technique described above to the important case of calibration when the tanks contain liquid. This is a usual condition for shore storage tanks and occurs also for shipboard tanks when calibration is required in service, e.g., after electronic repairs. The technique described provides for obtaining and storing initial data on the installed sensor segment and cable combinations which can be used subsequently with the transfer calibrator to simulate the characteristics of the partly filled sensor and the long cables for purposes of calibration as though the tank were empty.

The foregoing "transfer calibration system" is especially useful in level gauging systems when the tanks contain liquid. It restores the calibration capability to the equivalent of the empty tank case.

Thus, the '311 patent provides a valuable means for adjustment of the system when the tanks are empty and dry, and the transfer calibrator described in U.S. patent application Ser. No. 604,544 now U.S. Pat. No. 4,528,839 provides a similar capability when the tanks are partly full. With these adjustments the gauging system is prepared for service use including the first filling. However, the adjustments are based on predictions of the circumstances of use: the density and composition of the cargo vapor, and the capacitances and lengths of the segments at the cargo temperature. Since cargo such as LNG may be maintained at temperatures of $-160°$ C. or so and since the cargo may derive from sources of substantially different composition depending on the country of origin (and indeed on the particular well and the particular year), the estimates on which the adjustments are based are, to a degree, necessarily inaccurate.

There remains a significant need for apparatus and methods for precise calibration of liquid level measurement systems which can be performed rapidly and accurately. Such systems must be rapid, safe, and reliably accurate at the time of custody transfer, or other use. Additionally, positive assurance that the measuring equipment is working within the appropriate performance specifications at the time of measurement is important to buyers, sellers, and international customs and surveying officials around the world. A further need for an historical record of previous calibrations and correction parameters, and the respective dates, exists to give long-term reliability data and measurement confidence. The present invention fills these significant needs.

The present invention calibrates the system in actual use: e.g., with the segments at actual temperature, the segments containing actual vapor, and with the segment capacitances being at their actual values. The residual errors following the warm, dry adjustment are determined and the measurements are corrected accordingly.

An advantage of this invention is that the calibration reference is used in actual circumstances at the time of custody transfer or measurement, rather than on simulations and predictions such as are known in the prior art.

Another advantage of the present invention is the provision of apparatus and methods for automatic calibration of the level gauging system to units of measure which can be traceable to precision national standards which are accepted around the world each time custody transfer occurs.

And another advantage of the present invention derives from the fact that two calibration points are achieved for each segment, providing two values for every segment from which a simple error correctional model may be calculated and stored.

Yet another advantage of this invention is the fact that even a system out of adjustment and producing somewhat erroneous data can be systematically and automatically corrected at the time of the actual measurement.

Still another advantage of this invention is the provision of means for incorporating, storing, and maintaining a data file history of calibrations and corrections.

Another advantage of this invention resides in the fact that previously built systems in existing carrier transports can be readily retrofit with the invention, and related segmented measuring devices of the prior art may be upgraded with minimal cost and effort, all during periodic dry dock or refitting periods.

DISCLOSURE OF THE INVENTION

The present invention provides a means for calibrating the measurement system in the circumstances of actual use and at or near the time of actual use. The effects of the actual sensor, cable and electronic unit environments are included in the calibration corrections, the essential calibration references being the measurable lengths of segments and their location with respect to tank bottom.

The Calibrator

The calibrator element of this present invention is preferably an additional short sensor segment, coaxial and integral with the segment to be calibrated (conventionally, the upper- and lower-most segments). Such calibrator segments are filled and drained from the interior of the measuring segment. The liquid levels in the calibrator segment and in the measuring segment are substantially identical and largely independent of waves in the tank or tilt of the tank as may occur on shipboard. It is contemplated that the liquid level within the calibration sensor segment may oscillate somewhat because of agitation of the liquid surface of the tank, and/or motion of the tank. The dynamic comparison of the calibrator and measuring segment indicated values, as the liquid level traverses the length of the calibrator during filling/draining or over an interval of time at a constant average level, enables collection of difference quantity data values. These values can be computer processed to obtain corrected values for the measuring segment indications.

In an alternate embodiment, a very short axial length coaxial calibrator segment or other sensing device is used as an accurate discrete level or point sensor to locate a specific point with reference to the tank bottom for calibration purposes.

The precise position of the calibrator above the tank floor can be confirmed at the time of initial and subsequent tank survey, such as at commissioning and/or refitting intervals.

The Calibration and Measurement System

The overall measurement and calibration system according to the present invention includes the major elements of (1) a plurality of sensor modules having multiple measuring segments, (2) a plurality of electronics units, each having at least one signal source and a plurality of amplifiers and ac-to-dc converters, (3) a switching network, and (4) a computer for controlling the switching network and for performing data gathering, storage and manipulation functions, and usually (5) at least one calibrator or calibration sensor. For convenience, the signal path from each segment or calibrator element through an amplifier and an ac-to-dc converter to the switching network is referred to as a "channel", the system being made up of many similar measurement channels and usually at least one calibrator channel.

The other principal elements and concepts of the invention include the following:

(a) The Calibrator Segment and Channel
(b) The Correction Model
(c) Data Capture
(d) Data Storage and Measurement Correction

(a) The Calibrator Segment and Channel

The lowest sensor segment is usually not completely emptied nor is the highest sensor segment completely filled. Each of these segments is ordinarily provided with a short integral calibrator segment which performs a process measurement while all parts of the calibrator channel are exposed to the same conditions as the corresponding parts of the measuring channel. One of the two required calibration values for the measurement segment is obtained by means of this calibrator channel. As will be seen later, this calibrator channel is substantially more accurate than a measuring channel. The other calibraton value is obtained for the top segment when liquid is below the segment, and for the bottom segment when liquid is above the segment.

(b) The Correction Model

From the calibration values for an individual segment whether equipped with a calibrator segment or not, two correction parameters are computed (zero and scale factors) which are used in a mathematical correction model. This model enables correction of measured data throughout the length of the segment.

(c) Data Capture

Operations in service present frequent opportunities for measurement of the needed calibration values, particularly at loading and discharge, but in general operations as well. The required data are the segment channel measurements when liquid is below the segment, when liquid is above the segment, and data pairs from the calibrator and the measuring segment for entry into an averaging formula. A computer program controls scanning of all segment channels and the "capturing" of this data and data computed from it, to storage for use in the correction model. (By "capture" is meant the detection, measurement, and storage of particular values.)

(d) Storage and Data Correction

Two correction parameters (the zero and scale factors) for a segment are retained in computer storage. These, together with the correction model, are used to determine a corrected value corresponding to every measured value. The corrected value is displayed and the correction parameters are retained also in a trend file for long term evaluation of the system condition.

In tanks containing a fluid material such as LNG, certain fluid level meters use sensor modules comprised of one or more capacitive level sensor segments, each having essentially constant resolution per unit of length, and usually one sensor module is used per tank. This is one type with which use of the present invention is intended. As is known in the art, the sensors may be formed of an outer electrode which is generally electrically continuous, and from an inner electrode which is preferably segmented. These are referred to as 'sensor segments' or simply 'segments'. It may be desirable to use shorter lengths for the top- and bottom-most sensor segments. The outer electrode of the prior art sensors is generally the common electrode. The outer electrode is positioned within the tank so as to be substantially submerged in the tank when the tank is full.

The outer common electrode may be driven from a remote oscillator. The output of the oscillator is controlled by the output of a reference sensor which is also driven from the oscillator. This oscillator is controlled by the reference sensor such that the driving current through the reference sensor is held constant, independent of changes in the dielectric constant of the fluid being measured. The output of each sensor segment is thus assured to be independent of the dielectric constant of the fluid and dependent only on the fluid level between the sensor electrodes. This apparatus is described in greater detail in U.S. Pat. No. 3,797,311.

A switching network is interposed between the level sensor outputs and an indicator which displays the level reading. This switching network may be controlled manually, electronically, or under computer supervision. The level sensor is connected to the indicator through the switching network in accordance with the level of fluid in the sensor segments. This is ordinarily accomplished by comparing the sensor channel outputs with reference values corresponding to pre-selected levels associated with the sensor segments, then connecting and/or disconnecting segments to or from the indicator as the fluid level passes into or out of the ranges related to the respective segments. The indicator readings or values may be electronically stored for later comparison or use.

When the fluid level is within the range of the lowest segment, only this lowest segment is connected to the indicator. When the fluid level is within the range of an upper segment, only this upper segment is connected to the indicator; to account for the fluid below this upper segment, a fixed value corresponding to the height of the fluid level at the bottom of the upper sensor is added to the output of the upper segment so that the total height of fluid may be accurately indicated. The fluid may thus be accurately measured throughout the length of the sensor.

The fixed value which is to be added to the output of a segment can be calculated and generated with great accuracy merely by knowing the number of submerged segments and their lengths. The lengths of the segments can be measured precisely and accurately prior to installation. Accurate calibration of the segment which intercepts the liquid surface can be provided by the apparatus and method of the present invention. Further, the changes in length due to immersion in the fluid whose level is to be measured can be calculated from measurement of the fluid temperature and from knowledge of the thermal expansion characteristics of the sensor. This value may be added to the sensor output in an analog-to-digital converter known to those skilled in the art, or an equivalent function may be performed by a computer.

This technique allows one to construct a standard meter system and then accommodate it to a given installation readily and inexpensively. Further, it avoids the need for precise, adjustable reference voltage sources. The technique is especially advantageous when the system is to be switched among several tanks which have different dimensions and thus different heights for the segments. In such a case, one need only reset the reference heights for each tank prior to measurement. This can be done manually or electronically by use of separate storage for each tank. These functions are implemented by using a small digital computer.

Each level sensor segment, as well as the reference sensor, may be compensated for its "empty", "dry" or "air" value so that the effective output of each segment corresponds to the change in capacitance of the segment caused by the presence of fluid between its electrodes. The compensation is performed by a simulation technique which includes connecting the output of the segment to a summing junction and then subtracting from it a signal corresponding to the output of the segment when it is empty. Provisions may also be made to cancel the effects of stray pickup at the summing junction by adding signals of appropriate magnitude and phase to cancel out the stray pickup.

Initial calibration for "zero" and "full-scale" of the sensors is accomplished by another simulation technique. The zero setting is accomplished by subtracting out the "empty" capacitance value of each sensor as noted above. "Full-scale" calibration is accomplished by disconnecting this compensation and setting the indicator to read full-scale when the sensor is empty.

To calibrate for full-scale, one normally would except to have to immerse the sensor in liquid. This would be extremely bothersome in the case of a large vessel such as a tanker, or in a storage tank. However, as noted earlier, the level sensor output is effectively the ratio of its capacitance to that of the reference sensor, and this ratio is the same whether both are fully immersed or both are empty. Thus to simulate and approximate full-scale for calibration, one need merely subtract the empty value compensation of the sensors and set the indicators to read full-scale when the sensors are empty. In practice, an adjustment may be included in the measuring circuitry to adjust the output of each sensor segment, and the reference sensor, separately for their full scale value.

A protective safety barrier interposed between the sensors and the remaining measurement system elements may be necessary to avoid excessive electrical signals and to prevent fire or explosion. The characteristics of this barrier are incorporated into the system which is calibrated.

The mounting of the sensors is important in cryogenic applications since there will be extensive changes in dimensions of the sensors when they are immersed in, or emerge from, the cryogenic liquid.

BRIEF DESCRIPTION OF THE DRAWINGS

Further features, advantages, and objectives of the present invention are illustrated in the drawing figures forming a part hereof, and in which like reference numerals signify like features. For convenience, certain formulas referenced in the text are included as drawing figures herein.

FIG. 7a through FIG. 7e is a compilation of formulas referenced in this text;

FIG. 8a through FIG. 8g shows the correction model and the computations employed to obtain correction parameters for all level configurations and all segment types.

BEST MODES FOR CARRYING OUT THE INVENTION

Figure 1:
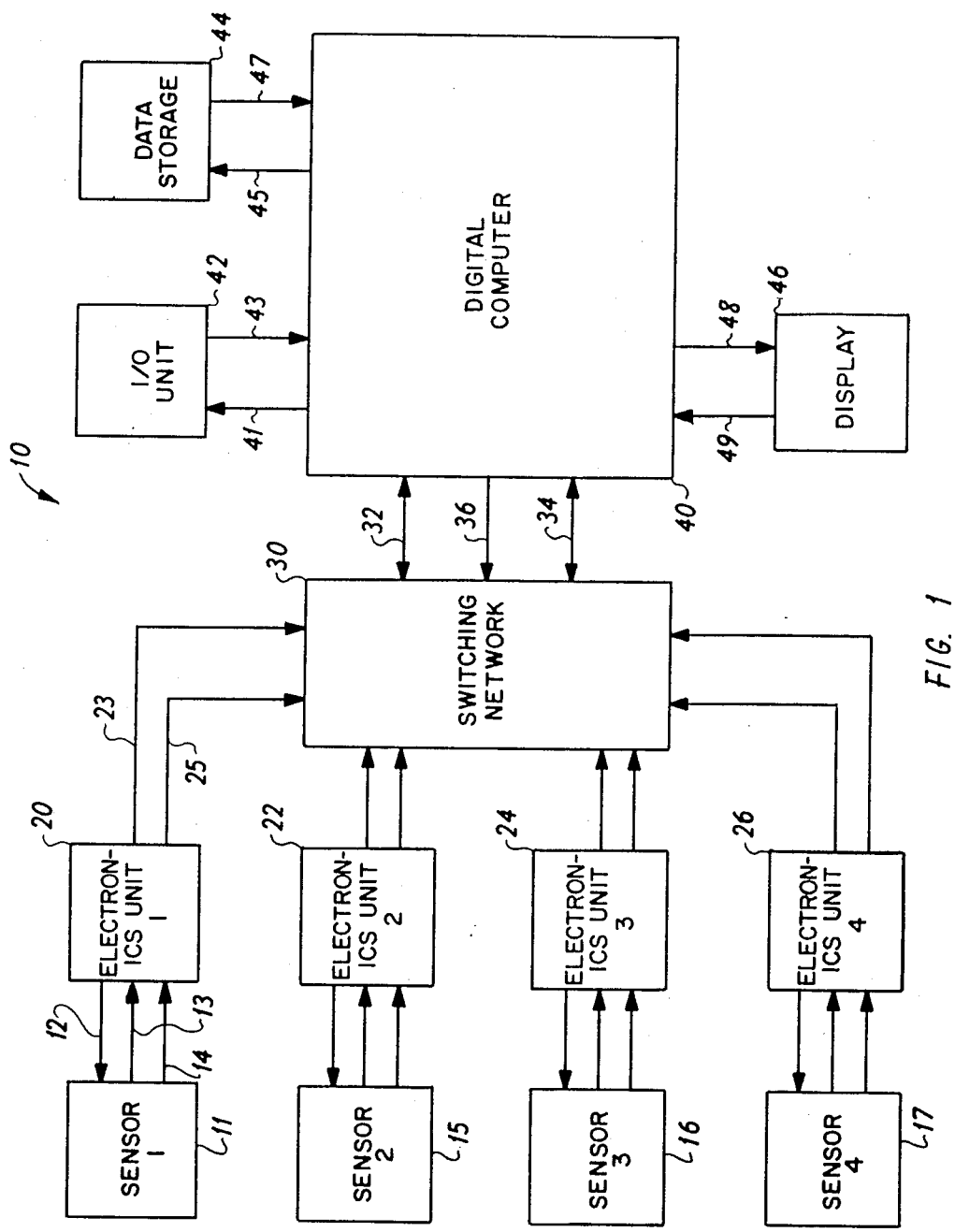
FIG. 1 is an illustrative block diagram of an operable multiple unit fluid level sensor system according to the present invention.

The following description of the present invention is discussed in terms of a coaxial capacitance column sensor module extending upward from the bottom of the ship or shore tank, in which the sensor module is segmented axially. The total length of the sensor module may range from a few meters to, more typically, tens of meters, and is commonly in the range of 10 to 50 meters. The measurement method typically consists of identifying the segments below the one which intercepts the liquid surface and summing the submerged segment lengths with the partially filled length of the segment which intercepts the surface. This surface-intercepting segment may be either the bottom segment if the tank is empty (or nearly empty), the top segment if the tank is full (or nearly full), or any segment therebetween if the tank is more than empty and less than full. In many situations, the tank is nearly empty or nearly full at the time of measurement.

Calibration according to the present invention consists in comparison of the value indicated by the measuring system with a corresponding independently determined reference value. It is achieved through computation of the difference in values, and construction of a mathematical model for correction of the system indication.

In the present invention, the reference for the uppermost segment is the location of a unique new calibrator device which is preferably coaxially integral with that segment and a measurement performed by the calibration channel. It performs a measurement while exposed to substantially the same conditions as is the measuring segment. The reference is without simulation (as in the prior art) or predictive assumptions such as the composition and density of the vapor in the sensor, temperature and/or density gradients in the liquid, and the cold empty capacitance value of the sensing segments.

Similarly, the lowest segment also includes an integral calibrator reference which performs functions at low tank levels similar to those of the upper calibrator at high tank levels.

The reference for an intermediate segment is the length of the segment itself, an accurately known value. The measurement value for comparison with this reference is taken when the liquid surface is above the segment and the segment is therefore known to be full.

Since each segment above the bottommost segment is supported from the tank bottom by the part of the sensor column below it, the temperature dependence of the length of this column must be accounted for. This factor is a well-known and stable dependence, easily calculated, and which is readily incorporated in the calibration calculations by one of ordinary skill in the art.

The prior art calibration technology provides for periodic system adjustments, such as when the tanks of a ship are empty during drydock maintenance procedures or when a shore storage tank is empty or, according to U.S. patent application Ser. No. 604,544, when a tank is partly full. The present invention is used when the system is in use (or in the conditions of use, such as at the time of measurement or custody transfer) to correct errors remaining after such system adjustment and to correct errors resulting from subsequent system drift or performance degradation. This invention is also used for automatic fine adjustment, to improve the accuracy of adjustment, and to reduce the time and effort required to make the adjustment.

In the preferred embodiment, the calibratoe 138 is coaxial with a coaxial capacitive measuring segment (116). During custody transfer, one or the other (top or bottom) calibrator is usually filled or drained. It is filled from the interior of a measuring segment, and thus the liquid levels in the calibrator and in the measuring segment are effectively the same, substantially independent of waves, or of the tilt angle of the tank. The liquid level within the sensor may oscillate somewhat in height due to agitation of the liquid surface within the tank and/or motion of the tank, as in the case of shipboard tanks.

A wave condition is accommodated in the preferred embodiment of this invention by extension of the calibrator axially an appropriate, short dimension, such as for example but not limitation, 25 centimeters; and then by a dynamic comparison of the calibrator and the measuring segment indications as the liquid level traverses the length of the calibrator during filling or draining procedures. The difference quantity data is then processed to obtain correction parameters for the measuring segment. The actual calibrator location with reference to the tank bottom may be optically confirmed at the time of commissioning and again at any subsequent tank survey to provide a known reference. The axial dimension of the calibrator is selected prior to installation, depending on the expected liquid oscillation amplitudes, rate of change of liquid level, data sampling rate, and required accuracy. Its length is a known value.

Now turning to FIG. 1, there is shown a block diagram of an operable multiple unit fluid level sensor system 10 for use in measuring fluid levels in a plurality of fluid containing tanks, each of which tanks includes a fluid level sensor module 11. Additional sensor module blocks 15, 16, and 17 are shown which are substantially similar in operation and function as sensor module 11. Sensor module 11 is shown in greater detail in FIG. 2 and described hereinafter. For the block diagram purposes of FIG. 1, however, the sensor module is simplified, showing an input line 12, and output lines 13 and 14, each representing a plurality of signal lines.

A plurality of electronics units 20, 22, 24, and 26 (shown in greater detail in FIG. 3) are interposed between sensor modules 11, 15, 16, and 17 and switching network 30. These electronics units are associated with respective sensor modules and a switching network 30, which provides electrical interconnections according to a predeterminable set of instructions such as from a digital computer 40. Each of said electronics units 20, 22, 24, 26 provides at least two groups of outputs, here represented by reference numerals 23 and 25. Equivalent circuits are provided for the other electronics units but are not referenced here as they are substantially identical.

Associated with a known digital computer 40 are a plurality of peripheral devices including the data entry—I/O unit 42, a data storage unit 44 which here include Random Access Memory (RAM) and/or either a hard or soft disk drive storage units such as are known in the computer arts, and a display output unit 46, also well known in the computer arts. A plurality of control and/or communications lines interface the computer 40 with its associated peripherals (42, 44, 46) and with the switching network 30. These lines may be single or multiple channel cables, as required; determination of the precise number and kind of such lines is dependent on the particular sensor system 10, and selection thereof is well within the skill of the ordinary designer. Included are a plurality of calibrator channel signal paths represented by lines 32 (ordinarily one per calibrator), a plurality of measurement channel signal paths (ordinarily one per measuring segment) 34, and a plurality of switching network control lines 36 for controlling the switching function. Data entry input and control lines 41, 43 represent the respective data entry—I/O computer functions; data storage input and output lines 45, 47 represent the respective data storage input, output, and control functions; and display return and output lines 48, 49 represent the respective computer controlled display function. Additional dedicated display units may also be provided.

Figure 2:
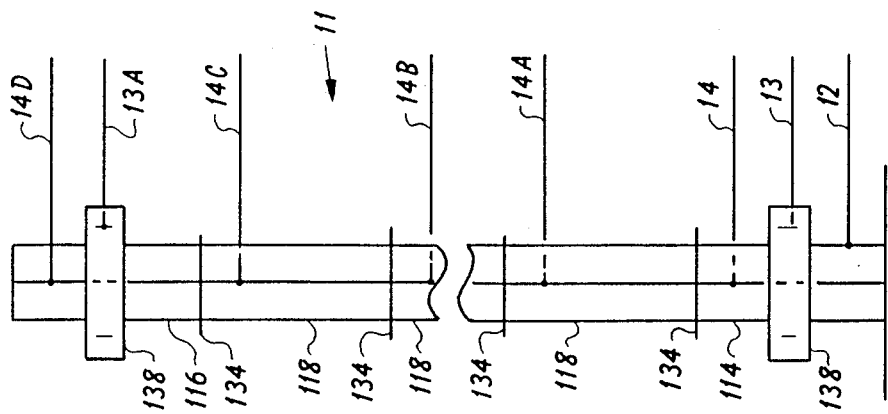
FIG. 2 is a simplified diagram, generally showing a sensor module and its elements.

In FIG. 2, there is shown a sensor module 11, or stack, which includes bottom (114), middle (118), and upper (116) segments, which may for example be coaxial capacitive fluid sensor elements such as are described in U.S. Pat. No. 3,797,311. Calibrator units 138 are included with the bottom segment 114 and at least one upper segment 116. A plurality of segment joints 134 are shown for joining the successive segments in abutting relation. An input line 12 carries the alternating-current source voltage for driving the segments, and a plurality of output lines 14 (14a through 14d) are used to convey the sensed or measured outputs to the electronics unit 20 for further processing. Note that each segment includes its own output signal line; each such line is usually a separate sealed coaxial cable. A plurality of similar cables or lines 13 (13a) are provided to convey the calibrator signals to the electronics unit 20.

Figure 3:
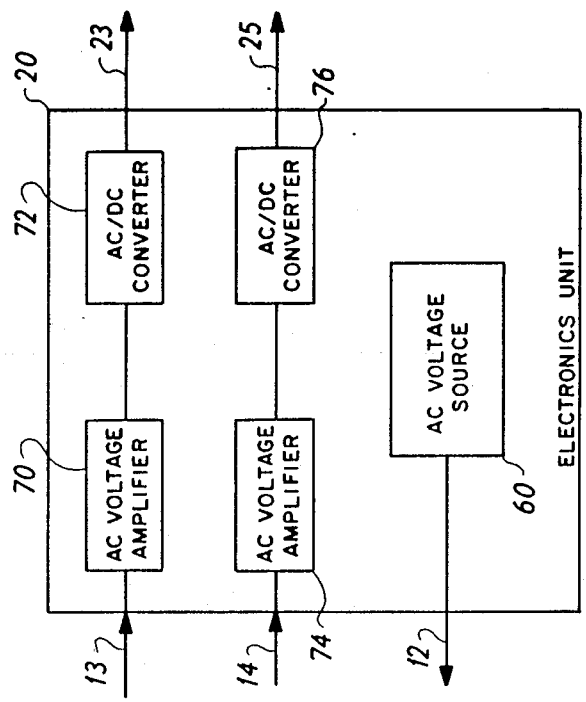
FIG. 3 is a simplified diagram of an electronics unit forming a part of the system.

FIG. 3 shows in block diagram form the elements associated with the respective electronics units 20, 22, 24, 26 of FIG. 1, which are shown here for clarity as separate units. Alternatively, they can be separable circuits on or in a single electronics package. Each such electronics unit as shown here includes one or more separate calibrator channels, a plurality of separate measurement channels, and a signal source. Some redundancy can be provided if needed. In FIG. 3, a calibrator channel in the electronics unit 20 is represented by calibrator line 13, alterating-current voltage amplifier 70, alternating-current voltage-to-direct-current (AC/DC) voltage converter 72, and output line 23. A measurement channel is represented by measurement line 14, alternating-current voltage amplifier 74, AC/DC voltage converter 76, and output line 25. Alternating-current voltage amplifiers and AC/DC voltage converters are well known in the electronics arts. A source 60 capable of supplying a safe, low-voltage alternating-current drive level is shown, which supplies the drive to the segment module 11 via line 12. The source 60 may be designed to supply a fixed or variable output voltage level as desired. Such a source is described in U.S. Pat. No. 3,797,311 and is of a design generally well-known in the electronics arts.

A d-c level analog-to-digital (A/D) converter function may be required to convert the direct-current signal levels to digital signals which can be processed by the computer. These A/D converters can be incorporated into the electronics unit (one per channel) or into the switching unit (where at least one is required), as needed.

Figure 4:
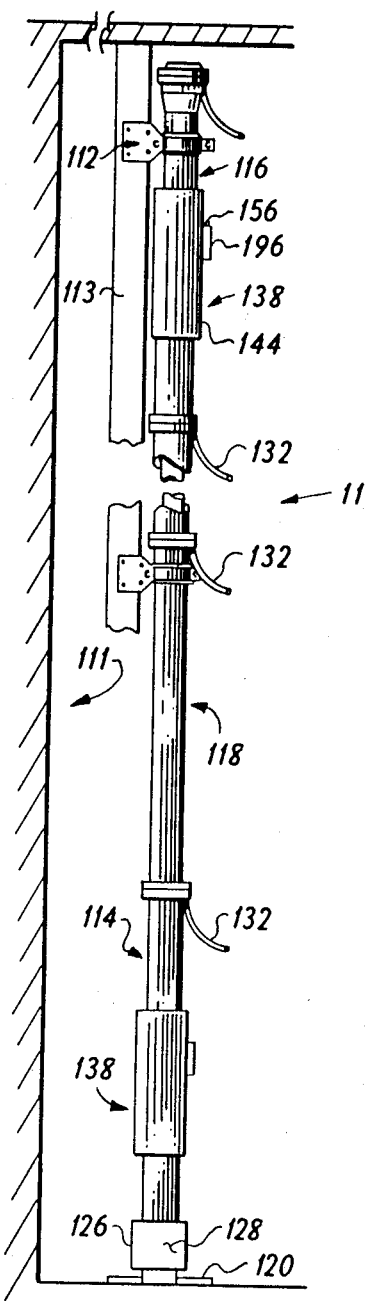
FIG. 4 is another, more detailed view of a sensor module as in FIG. 2.

Referring now to FIG. 4, there is shown an expanded view of sensor module 11, positioned in the interior of a tank 111 for immersion in a fluid (not shown) whose level is to be measured. For the present descriptive purposes, the tank 111 may be any one of a multiplicity of individually identifiable tanks in a land-based tank farm, one in a series of connected carriers of fluid (railcar, inland barge), or one of many tanks in a marine tanker.

The sensor is shown mounted in the tank 111 by means of supporting brackets 112 connected between the sensor module 11 and a mounting plate 113 which is supported from the roof or from the bottom of the tank. It is especially important that the sensors be mounted to accommodate relative motion between the sensors and the structure from which they are supported. A simple yet effective supporting bracket which accommodates this motion is described in U.S. Pat. No. 3,797,311. The sensor module 11 is formed of a plurality of separate sensor segments, represented here by upper segment 116, lower segment 114, and a plurality of intermediate segments such as 118. Upper segment 116 and lower segment 114 are substantially identical, each having incorporated therewith a coaxial calibrator 138 portion having an axial dimension substantially shorter than that of the segment. In most applications, only a single calibrator 138 portion need be incorporated with each of the upper-most and lower-most segments 116, 114. However, additional calibrators on other segments may be required if the tank is often only partially filled or often partially emptied.

Upper and lower segments 116, 114 sense the level of the fluid at the upper and lower extremes of a fluid level (not shown) range coextensive with the sensor module 11. The intermediate sensors 118 sense the level of the fluid when it is within a range intermediate the extremes.

The sensor module 11 is mounted on a base plate or flange 120 which is ordinarily attached to the floor of the tank 111 and provides an accurate reference point for fluid levels. When the tank 111 is a cryogenic fluid tank in a marine tanker, the tank is sometimes a relatively thin shell which is supported above a sub-floor (not shown) of the tanker itself and the weight of the sensor module 11 may ultimately be supported from this substructure. Reference sensor 126 may be supplied if needed in the form of a coaxial cylindrical capacitor having an outer electrode 128 and an inner electrode which is electrode 140 of FIG. 5. Alternating-current electrical energy is supplied to, and taken from, the reference sensor 126, the segments 114, 116, 118, and calibrator portions 138 by means of a plurality of cables 132. The calibrator cable connector 156 may be made available by means of a small compartment 196 to protect the internal cable attachment site.

The supporting brackets 112 are well known in the art, incorporating a pair of semi-cylindrical portions around the sensor module 1 and one or more plates for facilitating attachment of the bracket 112 to a mounting plate 113. The ring portion, formed by two semi-cylindrical portions, is electrically insulated and thus electrically isolates the sensor module 11 from the supporting structure 113. It also admits of axial motion of the sensor relative to the supporting bracket so that shrinkage or expansion of the sensor can be accommodated. Such rings are known which have been manufactured from silica-filled polytetrafluorethylene materials, such as that sold under the du Pont brand name "Rulon". The sensor segments are connected to each other by any convenient means, including flanges and bolts. The outer electrodes are abutted against one another to form a liquid-tight, sealed, electrically continuous electrode, while by contrast, the inner electrodes are maintained electrically separate from one another to form distinct sensor electrodes.

The foregoing sensor module 11 and intermediate segments 118 thereof are substantially identical to those of U.S. Pat. No. 3,797,311, except for the upper and lower segments 116, 114, and any additional segments which may include calibrator portions 138 described hereinafter, and reference sensor 126. While the preceding descriptions provide a detailed description of the apparatus with which the present invention calibrators work well, it should be understood that the description of the sensor module 11 and segment 114, 116, 118 and support apparatus 112, 113 are includes here for illustrative purposes only and not by way of limitation of the scope of the invention, as functional equivalents amounting to design choice modifications or variations are intended within the scope of the appended claims.

Figure 5:
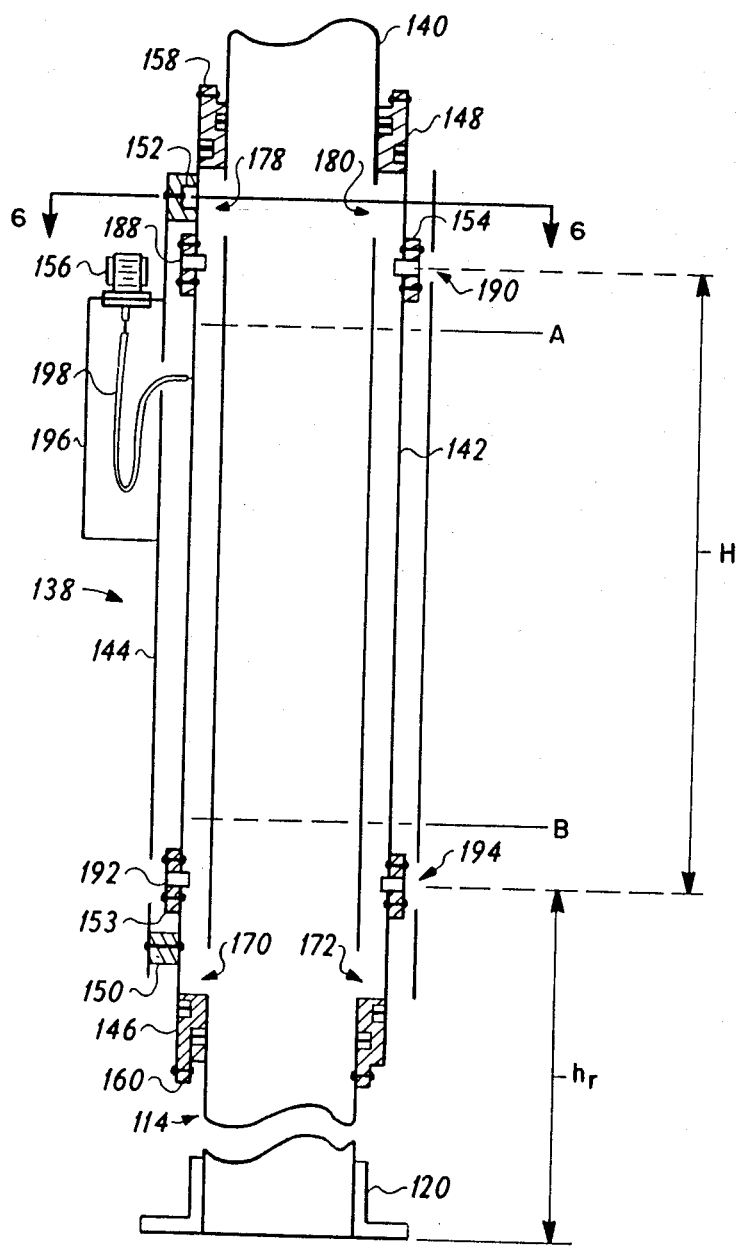
FIG. 5 is a cross section of a portion of a capacitive segment sensor with an integral coaxial calibrator segment according to a primary embodiment of this invention.

Turning now to both FIGS. 4 and 5, there is shown a coaxial capacitive calibrator 138 and portions of lower segment 114 of sensor module 11. All segments save for the upper segment 116 and the lower segment 114 are calibrated at both empty and full conditions, as these middle segments are ordinarily alternately fully covered or fully uncovered by the liquid. The remaining upper and lower segments are calibrated with calibrators 138 according to this invention.

The upper segment calibrator 138 must be located below the highest levels encountered, and the lowest calibrator 138 should be above the maximum low level to be encountered. The calibrators 138 are typically located at about the middle of the respective top and bottom segments 116, 114.

Details of the calibrator 138 are shown in FIG. 5. The calibrator 138 proper is a coaxial capacitance level gauge formed by the outer surface of the outer electrode 140 of segment 114 and by the inner surface of the calibrator signal electrode 142. The third major component of the calibrator 138 is the coaxial combination of cylindrical ground electrodes 144, 146, 148. Electrodes 144, 146 are rigidly and electrically joined together by at least one (typically three) electrically conductive spacer 150 (typically spaced at 120° radial locations). The electrodes 144, 146 are joined by threaded fasteners, rivets, welding or any equivalent method, which is a matter of design choice to one skilled in the relevant art. Electrodes 144 and 148 may also be rigidly and electrically joined as above. Alternatively, where large temperature gradients are encountered (as during filling with a cryogenic liquid), a plurality of metal contact spacers 152 may be provided. Spacers 152 must perform four functions: (1) low electrical impedance between electrodes 144 and 148, (2) uniform spacing between electrodes 144 and 142, (3) free flow of fluid therepast, and (4) sliding mechanical contact with electrode 148. Spacers 150 must perform the first three functions above, but with fixed mechanical and electrical contact. It is important to the proper functioning of the apparatus that either ohmic contact is achieved, or the electrical impedance from electrodes 144 to 148 is smaller by a factor of about 5 than the electrical impedance from electrode 148 to segment outer electrode 140. Greater electrode impedance between electrode 144 and 148 can introduce error in the calibrator measurement.

Two (e.g., upper and lower) insulating spacers 153, 154 are provided to support and maintain the calibrator signal electrode 142 between grounded electrodes 146 and 148. It is important that the portion of the insulating spacer (153, 154) which is between the calibrator signal electrode 142 and the ground electrodes 146, 148 is very short axially (i.e., in the dimension along the longitudinal axis) as will be more clearly explained hereinafter. Suitable insulating materials include filled polytetrafluorethylene and "RULON", a registered trademark of duPont Company for such filled insulation.

The segment 114 outer electrode 140 is the electrical drive electrode for the calibrator 138 as well as for the segment 114. The calibrator signal is an alternating current which is conducted from electrode 142 via connector 156 and a cable (not shown) to a terminating impedance (not shown) of such small magnitude that the potential developed on the signal electrode (142) is negligible as compared with the potential of drive electrode 140. It is desired that the magnitude of the electric field between electrodes 140 and 144 be effectively the same as the magnitude of the electric field between electrode 140 and electrode 148, and between electrode 140 and electrode 146. Note that ground potential electrical connection to the top and bottom elements of the calibrator inner electrode is accomplished by the cable shield, permitting these top and bottom elements to provide additional shielding of the signal electrode.

The configuration shown in FIG. 5 results in certain important advantages including having the physical bounds of the calibrator 138 well-defined at the ends of the signal electrode 142, positions readily identifiable by one or more scribe lines 188, 192 visible on insulators 153, 154. The scribe line 192 correspond to the level gauging "zero" line of the calibrator sensor 138. In general, the electrode and insulation selection and placements are such that the electric field in the calibrator is uniform in magnitude below, at, and above the interfaces between the signal electrode 142 and the adjacent ground electrodes 146, 148. On one side of the interface the field terminates on the ground electrode, on the other the field terminates on the signal electrode 142 which is essentially at ground potential. A further important feature of the configuration of FIG. 5 is that the increment of signal current corresponding to the presence of liquid between electrode 140 and either electrode 146 or 148 is negligible in the increment and signal current per unit height of liquid between electrode 140 and signal electrode 142 is constant throughout the height of the electrode 142. This results in a signal magnitude which is accurately linear with liquid height in the calibrator.

Still referring to FIG. 5, the structure which consists primarily of the signal electrode 142, the ground electrodes 144, 146, 148, and the insulating spacers 153, 154 and 158 is rigidly attached at one end to the segment outer electrode 140 but is isolated from it by insulating spacers 158, 160. The rigidity of the attachment of this structure positively locates the bottom of the signal electrode 142 at a measurable dimension $h_r$ above the face of the segment mounting flange 120. Physical measurement of $h_r$ and the calibrator gauging height H are facilitated by the respective sight apertures 190, 194. The dimensions can be visually confirmed or re-established when required during retrofitting.

Liquid access to the calibrator 138 is from the interior of the segment 114 by means of flow holes 170, 172 and vent holes 178, 180. Note that all potential access paths are sealed against the pressure of any difference in hydrostatic head between the exterior and the interior of the segment 114. It is important that the flow holes 170, 172 and the vent holes 178, 180 are made sufficiently large, and the leakage paths sufficiently small, to assure that the levels in the segment 114 and the calibrator 138 are the same.

The economy of electrodes which results from use of the coaxial configuration of the calibrator such as is shown in FIGS. 4 and 5, and the convenient and appropriate electrical drive provided by the segment electrode 140 are additional advantages of the present structure. It is important that the electrical drive to the segment outer electrode be supplied via a switching network (under computer control) at an a-c potential of several volts, depending on the liquid dielectric constant. By employing the same drive for both segment 114 and calibrator 138 channels assures the same dependence on signal drive amplitude, frequency, and dielectric constant in these channels. Additional advantages are derived from the minimal restriction to liquid exchange between segment 114 and calibrator 138, and the small cross-section of the calibrator when exposed to large external liquid flow velocities or sloshing in the tank 111.

Reference letters "A" and "B" identify electrode activation limits, described hereinafter in connection with the discussion on selecting calibrator length.

Figure 6:
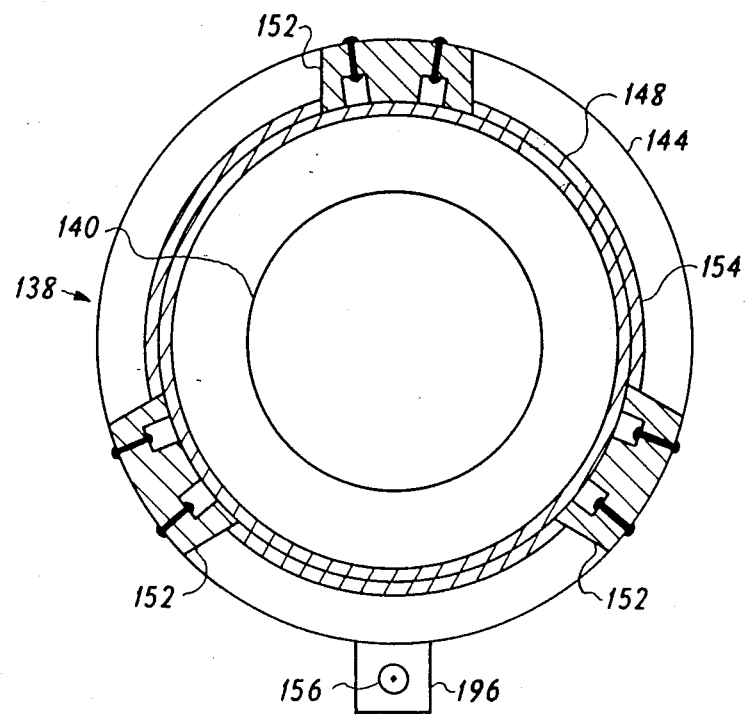
FIG. 6 is a transverse section plan view at line 6—6 of FIG. 5.

In FIG. 6 there is shown a partial cross section of the calibrator 138 and a sensor segment. The sensor segment outer electrode 140, calibrator electrode 142, ground electrode 144, connector 156, insulating spacer 158, and protective enclosure 196 fulfill functions as previously described. Here, three electrode spacers such as 152 are shown uniformly spaced between the calibrator outer element 144 and inner element 148.

Calibrator Length

The specific axial dimension of the calibrator can be optimized for the particular application. That is, the calibrator length can be selected in accordance with expected liquid oscillation amplitudes, rate of change of liquid level, data sampling rate, and desired accuracy.

For example, consider a liquid level rising within the measuring segment at a rate A, in millimeters per minute, which liquid level is simultaneously oscillating in amplitude at a frequency of B cycles per minute. It is desirable, in order to make an accurate comparison, to sample each cycle at least three times and preferably about five times and to sample at least three cycles and preferably about five cycles. To do so implies a minimum calibrator length of at least three×A/B mm, and preferably 5×A/B mm. For example purposes only and not by way of limitation, in a tank with a height of 20 meters and a load transfer period of about eight hours, the nominal value of A would be 41.7 millimeters per minute. Given an oscillatoin period (for purposes of this example) of one-fourth minute, B would be equal to 4, and the desired length of the calibrator (i.e., the calibration length) would be at least 3×41.7×0.25=31.3 millimeters and preferably 5×41.7×0.25=52.2 millimeters. And in this example, a sampling rate of 5×B or 20 samples per minute is preferred. In order to avoid a situation in which the first cycle of liquid level oscillation carries liquid below the bottom or above the top of the calibrator signal electrode, electrode activation levels (reference letters "A" and "B" of FIG. 5) can be preselected and stored in the system computer for use in determining the computational initiation and termination procedures. A calibrator length somewhat greater than 5×A/B may be desirable.

Should the calibrator be intended as a discrete, or "point", sensor according to an alternate embodiment use, a very small axial dimension may be desired. In order to recognize the brief transition of a discrete sensor, a very high data sampling rate may be needed, or a mechanism for interpolating to infer the time of transition. Thus for the preceding example, a discrete sensor with a height sensitivity of one millimeter and a liquid level rate of change in excess of 42 millimeters per minute, because of height fluctuation of 10 millimeter amplitude at a frequency of four cycles per minute, the least tolerable sampling rate would more preferably be 293 samples per minute, as compared with 20 per minute for the axially extended calibrator configuration. It should be borne in mind that such discrete sensors must be disposed to cope with the liquid level height oscillation without introducing error, and with provision for the many activations of the sensor which might occur.

Calibrator Accuracy

The calibrator channel is more accurate than the measuring segment channel as is explained herein. The errors of level gauges, both zero and span, are typically smaller the smaller the height span of the gauge. And the span of the calibrator may be only a few percent of that of the measuring segment, for example, 25 centimeters compared to 5 meters. Further, the calibrator itself is calibrated in real time by a technique of this invention, i.e., by capturing its zero and full values when the liquid level is below and above the calibrator respectively.

Consider therefore the errors in a capacitance level gauge, either a calibrator or a measuring segment. The measurement is described essentially in equation (1), shown in FIG. 7a. Errors result from small deviations from the expected values of several terms in the numerator of equation (1), FIG. 7a. They contribute height errors described by equations (2-5), shown in FIG. 7b through 7e. For example, changes in segment empty capacitance due to temperature and aging are shown in FIG. 7b. For another example, error in predicted values of vapor density and composition is shown in FIG. 7c. For yet another example, error in the balance network value is shown in FIG. 7d. And in another example, error in channel gain is shown in FIG. 7e. Thus, all these errors in "zero" and "scale" factor are proportional to the segment height H.

In using the calibrators in an on-line system of automatic calibration of liquid level gauges, it is necessary to understand the Correction Model and the Correction Parameters, discussed below.

The Correction Model

This mathematical model is employed to make corrections to the measured data in order to obtain more accurate values of liquid height.

For example, in a system in which the measured data is a linear function of liquid height, the model (FIG. 8a) contains two correction parameters unique to each segment, having values chosen to systematically fit the corrected data to basic reference data. The reference data is obtained from calibrators, from individual segments when they are empty of liquid and from individual segments when they are completely full of liquid. These are measurable physical lengths. The two correction parameters are a "zero" correction to be applied independent of liquid height, and a "scale" correction to be applied in proportion to liquid height. The values of the correction parameters are determined from data captured and stored during automatic calibration. See also FIGS. 8b through 8g. The correction model is shown in FIG. 8a. This correction model is applied automatically to the measured data by the computer.

For the top segment (or any upper segment equipped with a calibrator), the zero correction parameter $Z=E_o$, where $E_o$ is the captured value of the measured segment channel output when the liquid level is below the segment (see FIG. 8b). The scale correction parameter $K_s$ is computer from comparisons of segment channel measurements with the corresponding calibrator channel measurements. It is the result of averaging numerous measurements over the length of the calibrator, or over the length activated in the computer program; see FIG. 8c.

For intermediate segments not equipped with calibrators, the zero correction parameter $Z=E_o$. The scale correction parameter results from a single measurement when the segment is completely full of liquid as shown in FIG. 8d. For the lowest segment (or any lower segment equipped with a calibrator, the zero correction parameter is the result of comparisons with calibrator measurements as shown in FIG. 8e. The scale correction parameter is the result of a single measurement when the segment is completely full of liquid as is shown in FIG. 8f. From the point of view of correction parameters, the calibrator itself is similar to an intermediate segment. Its correction parameters are determined from two measurements, one when liquid is below the calibrator, and one when the liquid level is above the calibrator.

The calibrator zero correction parameter is $Z=E_o$.

The calibrator scale correction parameter $K_s=H/(L_{mf}-E_o)$.

The calibration corrected measurements in the calibrator channel are shown in FIG. 8g.

Figure 9:
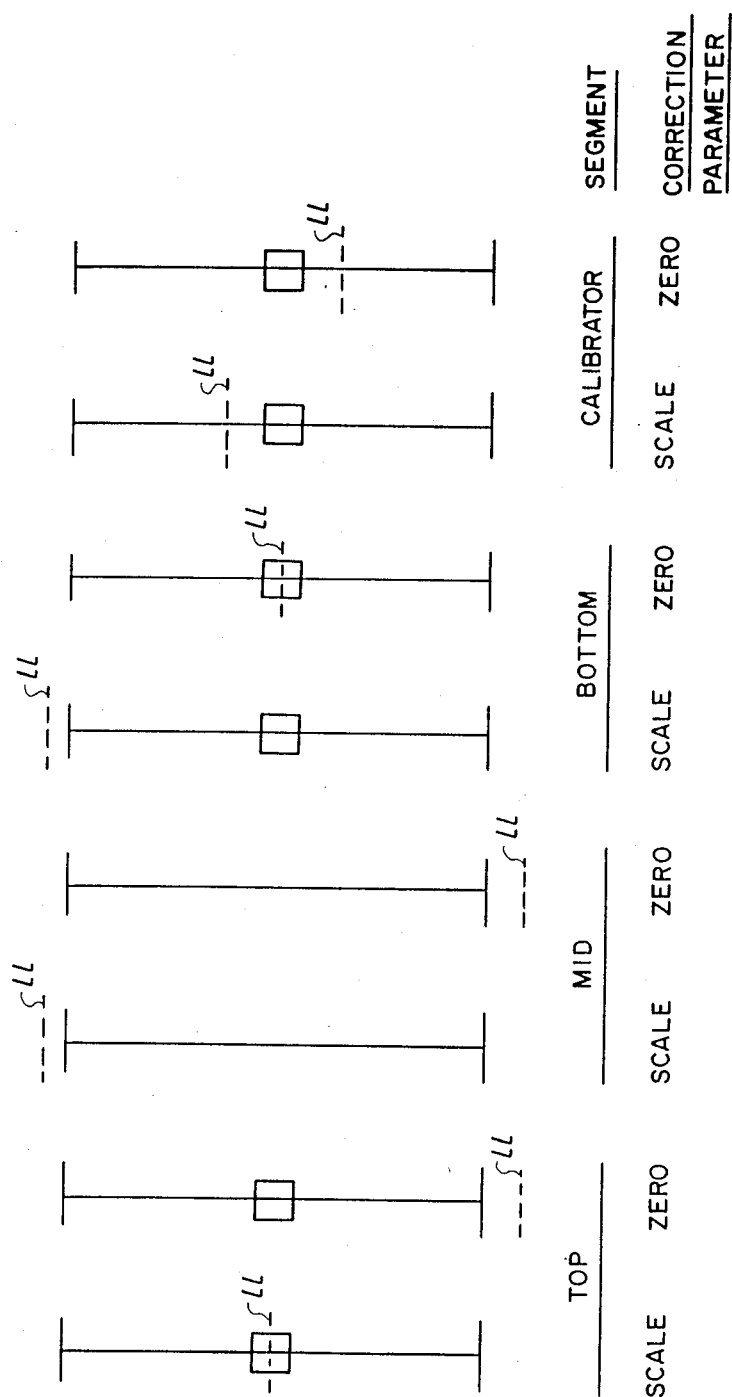
FIG. 9 illustrates the level configurations for capture of correction values for all segment types.

In FIG. 9, the various combination of segments and calibrators are shown in relation to the related possible liquid levels (LL). For the top segments with calibrators, the liquid level may be at the calibrator ("scale" correction parameter) or below the segment ("zero" correction parameter). For the middle segments, the liquid level can be above the segment ("scale" correction parameter) or below the segment ("zero" correction parameter). At the bottom segments, the liquid level may be above the segment ("scale" correction parameter) or at the calibrator ("zero"). For the calibrators the level may be above the calibrator for the 'scale' correction parameter, and below the calibrator for the 'zero' correction parameter.

In all cases the liquid level may be rising, falling or static.

This invention provides means whereby the accuracy of system adjustments can be improved automatically and inexpensively. The procedure for automatic fine adjustment parallels in part the procedure for on-line automatic calibration and is described in the following operation section.

Operation

A plurality of computer control commands are provided to initiate the following operations, for on-line automatic calibration:

(a) when liquid level is low, acquire (or "capture") and update the empty correction values for all segment channels having segments above the liquid level, typically all segments but the bottom segment.

(b) when liquid level is high, acquire and update the full correction values for all channels having segments below the liquid level, typically all segments but the top segment.

(c) at loading, acquire and update all empty correction values prior to loading, during filling of the bottom segment acquire the "n" calibrator correction value pairs, when filling the top segments acquire the "n" calibrator correction value pairs, acquire and update all full correcton values.

(d) at discharge, update all full correction values for channels having submerged segments prior to discharge, during draining of the top and bottom segments, acquire the "n" calibrator correction pairs, and update all empty correction values after discharge.

(e) in all cases, update the corresponding parameters for the correction models for all channels and thereby correct all values entered into a Custody Transfer calculation and record.

For automatic fine adjustment when the tanks are empty, additional commands include:

(a) acquire and update empty correction values for all channels including calibrator channels.

(b) acquire and update full correction values for all channels, including top and bottom segment channels, individually disconnecting the appropriate channel or channel pair balance networks.

(c) update the correction parameters and employ the correction model to correct all indicated values.

We claim:

1. In combination with a capacitive fluid level sensor and a fluid, the height of which is to be measured, a capacitive fluid sensor calibrator comprising:
   (a) a first electrode of known axial length,
   (b) a second electrode of known axial length and spaced apart from said first electrode,
   (c) supporting means for maintaining said electrodes in known, fixed relation with said capacitive fluid level sensor,
wherein said capacitive fluid level sensor includes means for inducing an alternating-current voltage between said sensor and said first calibrator electrode.

2. Apparatus as in claim 1, wherein the first electrode and the second electrode are cylindrical and coaxial and form an annular region which includes fluid communicating passageways at the top and bottom, respectively, of the annulus thus formed.

3. Apparatus as in claim 1, wherein said capacitive fluid level sensor calibrator includes an inner electrode and an outer electrode, and wherein said fluid level sensor electrodes are coaxial with one another.

4. Apparatus as in claim 3, wherein the coaxial capcitive fluid sensor calibrator is coaxial with the coaxial capacitive fluid sensor.

5. Apparatus as in claim 4, wherein the coaxial capacitive fluid sensor calibrator is mounted external to the coaxial capacitive fluid level sensor.

6. Apparatus as in claim 3, wherein the calibrator first inner element is located within the second outer electrode, said first element is formed of axially displaced upper, median, and lower coaxial cylindrical portions having the same diameter which are respectively axially displaced and in which the median cylindrical portion is an electrode which is electrically isolated from the upper and lower cylindrical portions, by isolating means, which isolating means provide a fluid-tight seal of the axially displaced cylindrical portions, and the outer second electrode is fixedly attached and electrically connected at its lower end to the lower of said cylindrical portions and its upper end is spaced apart from the inner element.

7. The apparatus of claim 6, wherein the fluid level sensor outer element includes a first plurality of radial fluid communicating apertures axially spaced apart from a second plurality of radial fluid communicating apertures in said fluid level sensor outer element, and wherein the calibrator is sealingly secured coaxially about the fluid level sensor by respective upper and lower insulator rings to form a cavity between the inner calibrator electrode and the sensor outer element such that the cavity is filled and drained exclusively from within the fluid level sensor.

8. Apparatus as in claim 1, wherein the alternating current voltage level is maintained substantially stable and the current level varies regularly with the fluid level between the calibrator first electrode and the sensor outer electrode.

9. A fluid level sensor module for use in a tank enclosure adapted for holding a fluid, comprising:
   (a) a lower coaxial capacitive fluid level sensor segment including a calibrator portion,
   (b) mounting means for securing said lower coaxial capacitive fluid level sensor segment to the bottom of said tank, and
   (c) at least one upper coaxial capacitive fluid level sensor segment coaxial with and axially spaced apart from said lower sensor segment.

10. Apparatus as in claim 9, wherein at least one of said upper fluid level sensor segments includes a calibrator portion.

11. Apparatus as in claim 9, further including at least one intermediate coaxial capacitive fluid level sensor segment, which is coaxial with and between said lower fluid level sensor segment and said upper fluid level sensor segment.

12. The sensor module of claim 9, each of said calibrator portions further comprising:
   (a) an inner cylindrical coaxial calibrator element having proximal and distal ends and being formed of axially displaced lower, median, and upper coaxial cylindrical portions having the same diameter, and
       (i) first isolation means for separating said lower coaxial cylindrical portion and said median coaxial cylindrical portion, and for providing a fluid-tight seal of the cylindrical portions, and (ii) second isolation means for separating said upper coaxial cylindrical portion and said median coaxial cylindrical portion, and for providing a fluid-tight seal of the cylindrical portions;

said inner calibrator element being spaced coaxially around the respective sensor segment along the longitudinal axis of said sensor segment and forming a first cavity between said sensor segment and said inner calibrator element;

(b) an outer cylindrical coaxial calibrator electrode spaced along the longitudinal axis of said inner calibrator element and having proximal and distal ends, and forming a second cavity between said outer calibrator electrode and said inner calibrator element;

(c) electrically conductive lower spacer means for fixedly securing the proximal end of said outer calibrator electrode to said inner calibrator element near the proximal end of the lower portion of said inner element;

(d) electrically conductive upper spacer means for separating the distal end of said outer calibrator electrode from the upper portion of the inner calibrator element near the distal end thereof;

(e) lower electrically insulating spacer means for securing the proximal end of the inner calibrator element to the outer surface of the respective sensor segment along the longitudinal axis thereof, and for forming a fluid-tight seal between said inner calibrator element and the sensor segment; and (f) upper electrically insulating spacer means for spacing the distal end of the inner calibrator element from the outer surface of the respective sensor segment along the longitudinal axis thereof and for forming a fluid-tight seal between said inner calibrator elements and the sensor segment.

13. Apparatus as in claim 12, further including cable communication means connected to the median portion of the inner calibrator element for electrically contacting said median portion, wherein said cable includes an electrical pathway means for grounding the upper and lower coaxial cylindrical portions of the inner cylindrical coaxial calibrator element and electrical pathway means for grounding the calibrator outer electrode.

14. Apparatus as in claim 12, wherein the electrically conductive upper spacer means maintains the outer calibrator electrode uniformly coaxial with the inner calibrator element.

15. Apparatus as in claim 9, further including upper and lower radial fluid communication passageways spaced axially along the longitudinal axis of the respective sensor segment, said passageways connecting said calibrator annular region to said respective sensor segment annular region.

16. Apparatus as in claim 13, wherein the fluid communicating passageways permit substantially unrestrained fluid communication between the respective sensor segment interior and the calibrator first cavity.

17. Multiple unit fluid level sensor system for use in measuring fluid levels in a plurality of fluid-containing tanks, comprising:

(a) a plurality of fluid level sensor modules, each of which includes (i) a bottom sensor segment and at least one upper sensor segment, (ii) means for fixedly mounting one end of said sensor module within a fluid containing tank, and (iii) at least one fluid sensor calibrator, wherein each sensor segment includes a respective calibrator channel cable and each calibrator includes an associated calibrator channel cable, and each sensor module includes at least one sensor drive cable;

(b) a plurality of source means for supplying an alternating-current drive voltage to each sensor module, and a plurality of signal processing channel means for producing a signal level related to the proportion of fluid within each respective segment, and for producing a signal level related to the proportion of fluid within each respective calibrator included with the sensor module;

(c) switching network means for selectively making connection to the sensor segment and calibrator channels; and (d) computer means including input/output means, data storage means, display means, arithmetic and logic unit means, and central control unit means, all capable of cooperating under programmed control; wherein said source means supplies a voltage to the fluid level sensor module and to the calibrator via an input cable, said processing means receives a signal related to the sensed fluid level via an output cable for each measurement channel and each calibrator channel, and such signals are processed and stored by the computer to provide corrected output displays and corrected segment and total measurements related to specific sensor channels and tank fluid levels.

18. Apparatus as in claim 17, wherein each sensor module further includes at least one intermediate fluid level sensor segment between said bottom sensor segment and said top sensor segment.

19. Apparatus as in claim 17, wherein each fluid level sensor module includes at least two calibrators, one of which is displaced coaxially along the longitudinal axis of the bottom sensor segment and another of which is displaced coaxially along the longitudinal axis of the top sensor segment.

20. Apparatus as in claim 17, wherein the signal processing means associated with each channel includes an alternating-current to direct-current signal converter for changing signal values to a d-c signal related to the level of the measured fluid.

21. Apparatus as in claim 17, wherein each of said segment-related channels includes a coaxial capacitive fluid level sensor segment, a signal cable, and signal conversion means for changing the signal to a signal suitable for the computer means.

22. Apparatus as in claim 21, wherein the fluid level in each sensor is measured by sensing the dielectric in at least one coaxial capacitive fluid level sensor segment.

23. Apparatus as in claim 22, wherein the fluid level in each calibrator is measured by repeatedly sensing the dielectric in said calibrator at regular time intervals.

24. Apparatus as in claim 17, wherein said switching network is associated with at least one A/D converter for converting analog measurement signal values to digital measurement signals for utilization by said computer.

25. Apparatus as in claim 17, wherein the fluid level in each calibrator is measured by sensing the dielectric in said calibrator.

26. Apparatus as in claim 17, wherein the signal processing is adapted to repeatedly sample the measurement of each calibrator signal over time and supply same to the computer.

27. In a liquid level measurement system for generating a system measurement value representing the liquid height to be measured in a tank, apparatus for calibrating the system under actual use conditions comprising:
   (a) means for producing a first measurement value when the liquid height is at a first known level.
   (b) means for storage of said first measurement value,
   (c) means for producing a second measurement value when the liquid height is at a second known level,
   (d) means for storage of said second measurement value,
   (e) means for determining a zero correction parameter and a scale correction parameter as functions of the first and second measurement values and of the corresponding known liquid heights for use in correcting the system measurement value representing the liquid height to be measured, and
   (f) means for determining a corrected value of measured liquid height as a function of the system indication and the zero correction and scale correction parameters.

28. Apparatus as in claim 27, wherein:
   (a) the means for determining zero correction and scale correction parameters as functions of the first and second measurement values and of the known levels for use in correcting the system measurement value representing the liquid height to be measured, and
   (b) the means for determining a corrected value of liquid height as a function of the system indication and the zero correction and scale correction parameters
is an electric computer.

29. Apparatus as in claim 27, wherein said means for producing said first and second measurement indication values is a liquid level sensor.

30. Apparatus as in claim 29, wherein said sensor is segmented axially and includes at least two segments.

31. Apparatus as in claim 29, wherein the first measurement value represents zero liquid in a segment when the liquid level is below the segment being calibrated and the second measurement value represents a liquid height in the segment equal to the length of the segment when the liquid level is above the segment being calibrated.

32. Apparatus as in claim 29, wherein said first measurement value represents zero liquid in a segment when the liquid level is below a subject sensor to be calibrated, and further comprising:
   (a) means for generating a second measurement value of liquid height in a segment and generating a corresponding known value via a calibrator channel employing a calibrator segment which is integral with the sensor segment being calibrated and at a known location relative to the segment,
   (b) means for generating a plurality of additional second measurement values and corresponding known values; and
   (c) means for calculating an average value for a corresponding model parameter.

33. Apparatus as in claim 29, wherein said first measurement value represents a height of liquid in a segment equal to the length of the segment when the liquid level is above a subject sensor segment to be calibrated, and further comprising:
   (a) means for generating a second measurement value of liquid height in a segment and for generating a corresponding value via a calibrator channel employing a calibrator segment integral with the sensor segment being calibrated and at a known location relative to the segment.
   (b) means for generating a plurality of additional second measurement values and corresponding known values, and
   (c) means for calibrating an average value for a corresponding model parameter.

34. In a liquid level measurement system for generating a system measurement value which represents the liquid height to be measured in a tank containing a plurality of sensor segments axially disposed along a vertical path, the method of calibrating the system under actual use conditions comprising:
   (a) generating a first measurement value which represents the liquid height in a segment when said liquid height is at a first known level,
   (b) storing said first measurement value,
   (c) generating a second measurement value which represents the liquid height in a segment when said liquid height is at a second known level,
   (d) storing said second measurement value,
   (e) generating zero correction and scale correction parameters for each segment channel as functions of the first and second measurement values and of the corresponding known liquid heights in the segment for use in correcting the system measurement value representing the liquid height to be measured, and
   (f) determining a corrected value of liquid height as a function of the system value and the zero correction and scale correction parameters.

35. The method of claim 34, wherein the first measurement value represents zero liquid height in the segment when said liquid height is below the sensor segment being calibrated and the second measurement value represents a liquid height in the segment equal to the length of the segment when said liquid height is above the sensor segment being calibrated.

36. The method of claim 34, wherein the first measurement value represents zero liquid height when said liquid height is below the sensor segment being calibrated and the second measurement value represents a liquid height in the segment when said liquid height is integral with the sensor segment being calibrated.

37. The method of claim 34, wherein the first measurement value represents zero liquid height in a segment when said liquid height is below the sensor segment being calibrated, and additional steps comprising:
   (a) generating a second measurement value of liquid height in a segment and generating a corresponding known value via a calibrator channel employing a calibrator segment integral with the sensor segment being calibrated and at a known location relative to the segment length,
   (b) generating a plurality of additional second measurement values and corresponding known values, and
   (c) calculating an average value for a corresponding model parameter.

38. The method of claim 37, wherein the additional second measurement values and known values are determined as the liquid level is rising.

39. The method of claim 37, wherein the additional second measurement values and known values are determined as the liquid level is falling.

40. The method of claim 37, wherein the additional second measurement values and known values are determined as the liquid level is static.

41. The method of claim 40, wherein the additional second measurement values and known values are determined as the liquid level is rising.

42. The method of claim 40, wherein the additional second measurement values and known values are determined as the liquid level is falling.

43. The method of claim 40, wherein the additional second measurement values and known values are determined as the liquid level is static.

44. The method of claim 34, wherein the first measurement value represents a liquid height in a segment equal to the length of the segment when said liquid height is above the sensor segment being calibrated, and additional steps comprising:
   (a) generating a second measurement value of liquid height in a segment and generating a corresponding value via a calibrator channel employing a calibrator segment integral with the sensor segment being calibrated and at a known location relative to the segment length,
   (b) generating a plurality of additional second measurement values and corresponding known values, and
   (c) calculating an average value for a corresponding model parameter.

* * * * *